United States Patent
Roache et al.

(10) Patent No.: US 10,867,425 B2
(45) Date of Patent: Dec. 15, 2020

(54) ADDING MOTION EFFECTS TO DIGITAL STILL IMAGES

(71) Applicant: Warner Bros. Entertainment Inc., Burbank, CA (US)

(72) Inventors: Donald Roache, Burbank, CA (US); Bradley Collar, Burbank, CA (US); Lewis Ostrover, Burbank, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 16/447,892

(22) Filed: Jun. 20, 2019

(65) Prior Publication Data

US 2019/0378318 A1 Dec. 12, 2019

Related U.S. Application Data

(63) Continuation of application No. PCT/US2018/013651, filed on Jan. 12, 2018.

(60) Provisional application No. 62/446,149, filed on Jan. 13, 2017.

(51) Int. Cl.
| | |
|---|---|
| *G06T 13/00* | (2011.01) |
| *G06T 13/80* | (2011.01) |
| *G06F 16/74* | (2019.01) |
| *G06T 5/00* | (2006.01) |
| *G06T 5/20* | (2006.01) |
| *G06T 5/50* | (2006.01) |

(52) U.S. Cl.
CPC ............ *G06T 13/80* (2013.01); *G06F 16/743* (2019.01); *G06T 5/002* (2013.01); *G06T 5/003* (2013.01); *G06T 5/20* (2013.01); *G06T 5/50* (2013.01)

(58) Field of Classification Search
None
See application file for complete search history.

(56) References Cited

U.S. PATENT DOCUMENTS

| | | | | |
|---|---|---|---|---|
| 6,081,278 | A * | 6/2000 | Chen | G06T 17/00 345/473 |
| 6,268,864 | B1 * | 7/2001 | Chen | G06T 13/80 345/428 |
| 6,278,466 | B1 * | 8/2001 | Chen | G06T 13/00 345/473 |
| 7,193,629 | B2 * | 3/2007 | Kake | A63F 13/10 345/581 |
| 7,359,576 | B1 * | 4/2008 | Worthington | G06T 5/20 382/205 |
| 8,766,985 | B1 * | 7/2014 | Kass | G06T 13/00 345/473 |
| 10,531,013 | B2 * | 1/2020 | Yasutomi | H04N 5/2625 |

(Continued)

OTHER PUBLICATIONS

WO, PCT/US2018/013651 ISR and Written Opinion, dated Apr. 5, 2018.

*Primary Examiner* — Martin Mushambo
(74) *Attorney, Agent, or Firm* — One LLP; Jonathan Jaech

(57) ABSTRACT

A digital still image is processed using motion-adding algorithms that are provided with an original still image and a set of motionizing parameters. Output of the motion-adding algorithms include a motionized digital image suitable for display by any digital image display device. The motionized digital image may be used in place of a still image in any context that a still image would be used, for example, in an ebook, e-zine, digital graphic novel, website, picture or poster, or user interface.

20 Claims, 6 Drawing Sheets

(56) References Cited

U.S. PATENT DOCUMENTS

| | | | | |
|---|---|---|---|---|
| 2002/0027555 A1* | 3/2002 | Mori | | G06T 13/00 345/475 |
| 2005/0270294 A1* | 12/2005 | Le Tuan | | G06T 13/00 345/473 |
| 2006/0044472 A1* | 3/2006 | Lee | | G09G 3/20 348/607 |
| 2006/0262142 A1* | 11/2006 | Nam | | H04M 1/72544 345/636 |
| 2008/0001950 A1* | 1/2008 | Lin | | G06T 13/80 345/473 |
| 2009/0147010 A1* | 6/2009 | Russell | | G11B 27/034 345/473 |
| 2009/0213143 A1* | 8/2009 | Igarashi | | G06T 3/0093 345/643 |
| 2010/0039447 A1* | 2/2010 | Nakao | | H04N 1/387 345/634 |
| 2010/0182324 A1* | 7/2010 | Ko | | G06T 13/80 345/473 |
| 2011/0234588 A1* | 9/2011 | Ostermann | | G06T 13/20 345/419 |
| 2012/0062700 A1* | 3/2012 | Antonellis | | G10L 19/008 348/43 |
| 2012/0188148 A1* | 7/2012 | DeJong | | G02B 27/0093 345/8 |
| 2012/0275509 A1* | 11/2012 | Smith | | H04N 19/17 375/240.01 |
| 2013/0050225 A1* | 2/2013 | Nakajima | | G06T 13/40 345/473 |
| 2013/0088573 A1* | 4/2013 | Collar | | H04N 13/204 348/46 |
| 2013/0093786 A1* | 4/2013 | Tanabe | | H04N 5/76 345/619 |
| 2014/0043363 A1* | 2/2014 | Bala | | G09G 5/00 345/629 |
| 2015/0172627 A1* | 6/2015 | Lee | | G06T 7/11 348/44 |
| 2016/0269712 A1* | 9/2016 | Ostrover | | H04S 7/302 |
| 2016/0379042 A1* | 12/2016 | Bourlai | | G06K 9/00288 382/118 |
| 2018/0174343 A1* | 6/2018 | Slater | | G06T 5/50 |
| 2019/0297313 A1* | 9/2019 | Nolan | | H04N 13/275 |

* cited by examiner

| REGIONS 402 | MOTION DATA 404 | FIXED DATA 406 | LIGHTING/ COLORATION 408 | OUTPUT VIDEO 410 |
|---|---|---|---|---|
| LOCATION SHAPE FIXED RIGID BODY DEFORMABLE | PATH CENTER ROTATION SCALE DEFORMATION RATES | OCCLUSIONS FILTERS PROGRESSIONS RATES | DIRECTION BRIGHTNESS HUE SATURATION RATES | FRAME SIZE FRAME SOURCE NUMBER RATE FORMAT |

710 — SELECTING A SOURCE DIGITAL STILL IMAGE FROM MEMORY

720 — DIVIDING THE SOURCE DIGITAL STILL IMAGE INTO AT LEAST TWO REGIONS COMPRISING ONE OR MORE NON-OVERLAPPING FIXED REGIONS AND ONE OR MORE MOVABLE REGIONS TO BE LAYERED OVER THE FIXED REGIONS, BASED ON A SET OF GEOMETRIC REGION BOUNDARY DATA AND MOTION DATA FOR EACH OF THE ONE OR MORE MOVABLE REGIONS

730 — DETERMINING VALUES FOR EACH PIXEL OF THE ONE OR MORE FIXED REGIONS THAT IS OCCLUDED BY THE ONE OR MORE MOVABLE REGIONS

740 — GENERATING A SET OF VIDEO FRAMES IN A SEQUENCE, WHEREIN EACH FRAME IN THE SET OF VIDEO FRAMES INCLUDES THE ONE OR MORE MOVABLE REGIONS TRANSFORMED BY THE MOTION DATA BASED ON A POSITION OF THE EACH FRAME IN THE SEQUENCE LAYERED OVER THE ONE OR MORE FIXED REGIONS

750 — STORING THE SET OF VIDEO FRAMES AS A VIDEO FILE

ADDING MOTION EFFECTS TO DIGITAL STILL IMAGES

CROSS REFERENCE TO RELATED APPLICATION

This application is a continuation of PCT/US2018/013651, filed on Jan. 12, 2018, which claims priority to claims priority pursuant to 35 U.S.C. § 119(e) to U.S. Provisional Application No. 62/446,149 filed Jan. 13, 2017, the disclosures of each of which are hereby incorporated by reference in their entireties.

FIELD

The present disclosure relates to methods and apparatus for adding motion effects to digital still images.

BACKGROUND

While various animation techniques are known in the art, such techniques often require motion data or video data, and are not suitable for creating moving images in cases where only a single still image, or a small set of still images not related by video data, is available.

For example, images for graphic novels are often drawn frame by frame for printing on traditional paper media. When preparing the same content for electronic media (e.g., an electronic book), it may be desirable to enhance one or more static images of the graphic novel with motion effects, for dramatic effect or for a more eye-catching appearance. For further example, it may be desirable to add motion effects to a promotional still image used in print advertising, for use in electronic media.

However, adding motion effects to a still image requires considerable manual processing by an artist or animator, making it cost prohibitive for some applications. In addition, if a high-resolution image is animated, the memory required for producing animated, high-resolution frames may exceed memory limits that apply to the desired electronic product. The producer may therefore need to choose between adding motion effects or lowering the quality of the image.

It would be desirable, therefore, to develop new methods, apparatus and systems, that overcome these and other limitations of the prior art, and that can create moving images in cases where only a single still image, or a small set of still images not related by video data, is available. Advantages may include automating or streamlining the addition of certain motion effects, and preserving the quality of image data while economizing on the amount of computer memory needed to hold the motionized image.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method by a computer including a processor coupled to a memory for addition of motion effects to digital still images may include selecting a source digital still image from the memory, and dividing the source digital still image into at least two regions. The at least two regions may include one or more non-overlapping fixed regions and one or more movable regions, which may be treated as if layered over the fixed regions. The dividing may be based on a set of geometric region boundary data (e.g., a digital mask) and motion data for each of the one or more movable regions. The motion data may be, or may include a set of motionizing parameters for a digital still image, or set of digital still images, retrieved from the memory. In some embodiments, each of the non-overlapping regions consists of a single pixel.

The method may include determining values for each pixel of the one or more fixed regions that is occluded by the one or more movable regions in any frame of a motionized result. This may include, for example, determining values for each pixel of the one or more fixed regions that is occluded by the one or more movable regions at least in part by extracting pixel values from a second source digital image wherein the pixels are not occluded by the one or more movable regions. In an alternative, or in addition, the determining may include determining the values for each pixel of the one or more fixed regions that is occluded by the one or more movable regions at least in part by generating the values procedurally based on non-occluded pixel values adjacent to borders of contiguous occluded pixel regions.

The method may further include generating a set of video frames in a sequence, wherein each frame in the set of video frames includes the one or more movable regions transformed by the motion data based on a time of the each frame layered over the one or more fixed regions, and storing the set of video frames as a video file in a non-volatile computer memory. In an aspect, generating the set of video frames may include arranging the set of video frames in an endless loop.

In an aspect, the motion data for each of the one or more movable regions may include an independently determined motion vector. Optionally, the independently determined motion vector varies with time over a path. Thus, the motion data for each of the one or more movable regions may include a motion vector that varies with time over a path.

The method may further include transforming the one or more movable regions for respective frames of the set of video frames. The transforming may include scaling the one or more movable regions based on the motion vector, the time of each frame, and data defining a camera position and focal length. The transforming may further include blurring at least a portion of the one or more movable regions in the each frame, based on a selected blurring algorithm. In an alternative, or in addition, the transforming may further include sharpening at least a portion of the one or more movable regions in the each frame, based on a selected sharpening algorithm. The blurring or sharpening may vary with time, or with pixel location.

In another aspect, the method may include transforming the one or more fixed regions for respective frames of the set of video frames. This transforming may include applying a pixel transformation filter to at least one of the one or more fixed regions. Applying the filter may include, for example, varying input parameters of the filter based on the time of each frame. For further example, applying the filter may include applying the filter to output of the filter for the preceding frame of the sequence. Applying the filter with different parameters in different frames may be used to create an illusion of motion of one or more objects appearing in the fixed region, or other dynamic visual effect.

Accordingly, as used herein, the phrases "fixed regions" or "fixed region" are not meant to describe or imply a region of an image in which nothing appears to move in the motionized result. On the contrary, the dynamic application of filters, or operations such as pan or zoom, may cause objects imaged in the fixed region to move, or to appear to move, relative to other objects in the fixed region, or relative to the frame of the motionized result (e.g., the video frame). Instead, the term "fixed region" is used to describe a region that does not move as a whole relative to the image, such as along a path or according to a motion vector or set of vectors. A movable region, however, does move, grow, shrink, or rotate according to some path, vector, or vectors, relative to other parts of the image. In addition, a movable region may also be processed in the same ways as a fixed region to obtain other dynamic effects within the movable region itself.

In another aspect of the disclosure, an apparatus for adding motion effects to digital still images includes a memory coupled to an image processor. The memory may hold program instructions that when executed by the processor, cause the apparatus to perform the method described above, and optionally one or more additional operations.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 7 is a linear flow chart illustrating other elements of a method motionizing a digital still image that may be executed by a motionizing apparatus.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
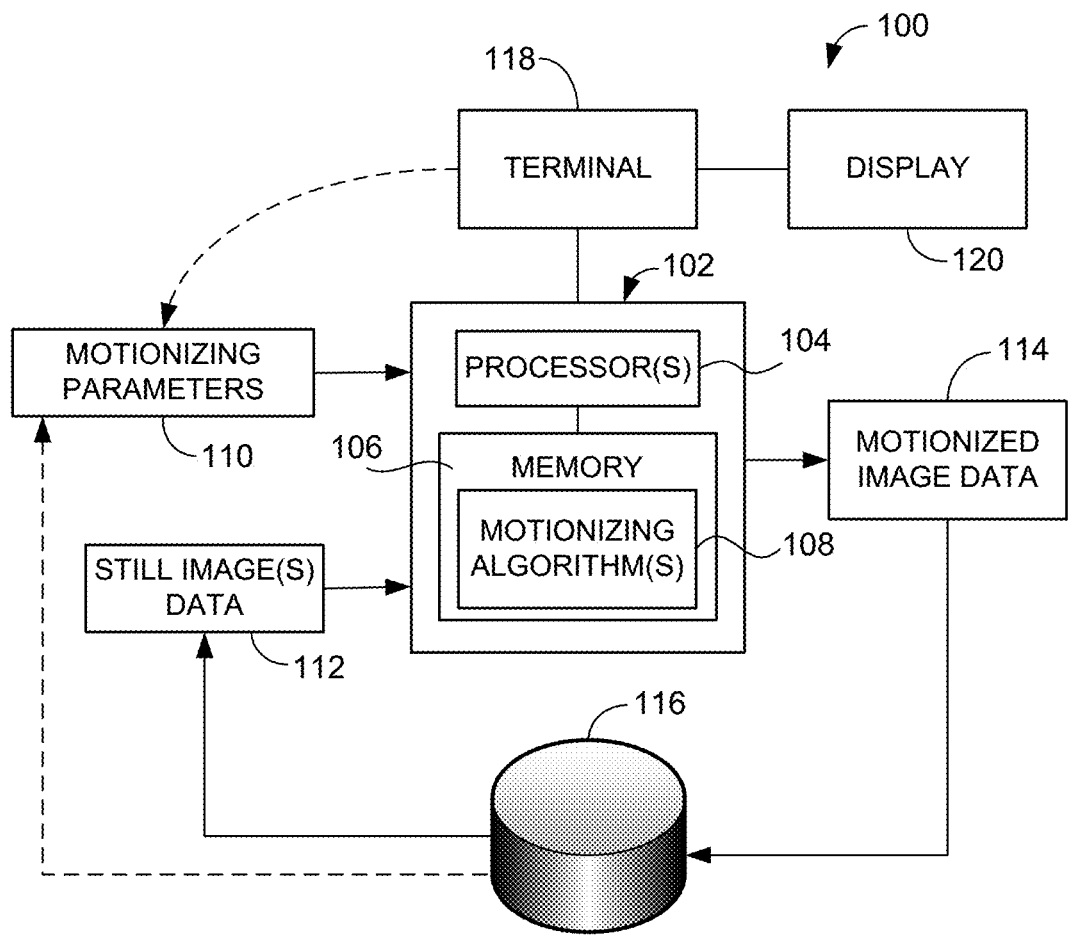
FIG. 1 is a block diagram illustrating aspects of an apparatus for addition of motion effects to digital still images.

Referring to FIG. 1, the present disclosure concerns an apparatus 102 and system 100 for adding motion effects to digital still images. The apparatus 102 and system 100 may include memory 106 holding program instructions 108, that when executed by a processor 104 of the apparatus 102, cause it to perform a method of motionizing still image data. These methods may be useful, for example, for motionizing still image data when video of actual movement data is not available for the scene at issue, or where processing such video using traditional animation techniques (e.g., by tweening or rotoscoping) is inefficient or too costly.

In an aspect of the methods, a digital still image 112 (e.g., TIFF, GIF, JPEG, PNG, etc. format file) is provided as input to an algorithmic motionizing process operating on a computer. For example, the image 112 may be created in digital form and reside as a digital file in electronic memory, where it can be read by a processor executing the motionizing process. In an alternative, the image may be scanned from a physical medium into an electronic format, and placed in the memory. The process 108 and the computer hardware 104 on which the present method operates are together sometimes referred to herein as a "motionizing module." Motionizing parameters 110 are provided to the motionizing module, for example, as batch data read from a data store, or entered via a user interface. Various motionizing parameters 110 and associated algorithms 108 of the motionizing module are described in turn. These algorithms may be combined by parallel or sequential operation, creating various motion effects for adding to an output motionized digital image 112 such as may be displayed on a digital display device 120. A user may interact and provide user input to the motionizing module via a terminal 118, including but not limited to setting values of motionizing parameters 110.

Figure 2:
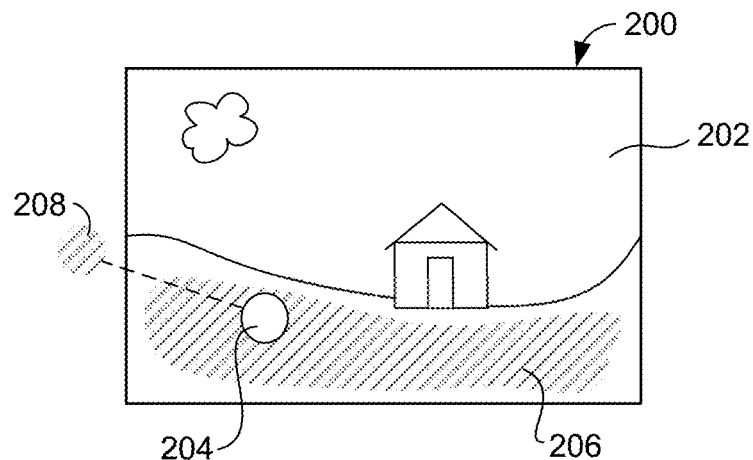
FIG. 2 is a schematic drawing illustrating parts of a digital still image as displayed by a digital display device.

In an aspect, the algorithms 108 include uniquely identifying objects or layers of the still(s) and 1) adding occluded information by providing only one (or more) different still photo source. Referring to FIG. 2, all of these images are referred to herein as 'key' frames, e.g. in a moving soccer ball scene 200, a key frame would occlude what's behind 208 the soccer ball 206. The illustrated image 200 includes at least three distinct regions, the soccer ball 204, grass 206 and sky 202. In one alternative, the system 100 may fill in the occluded data 208 based on the boundary conditions around the occluding object 204. For example, if the ball 204 is surrounded by grass, an interpolation and transfer algorithm may be used to fill in the occluded space 208 with a pattern that resembles the grass region 206 and matches it around the occluded region boundary. This may be aided by an operator selecting a portion of the grass image 206 to be replicated or used as a basis for generating the pixel pattern needed to fill in the occluded part.

Figure 3:
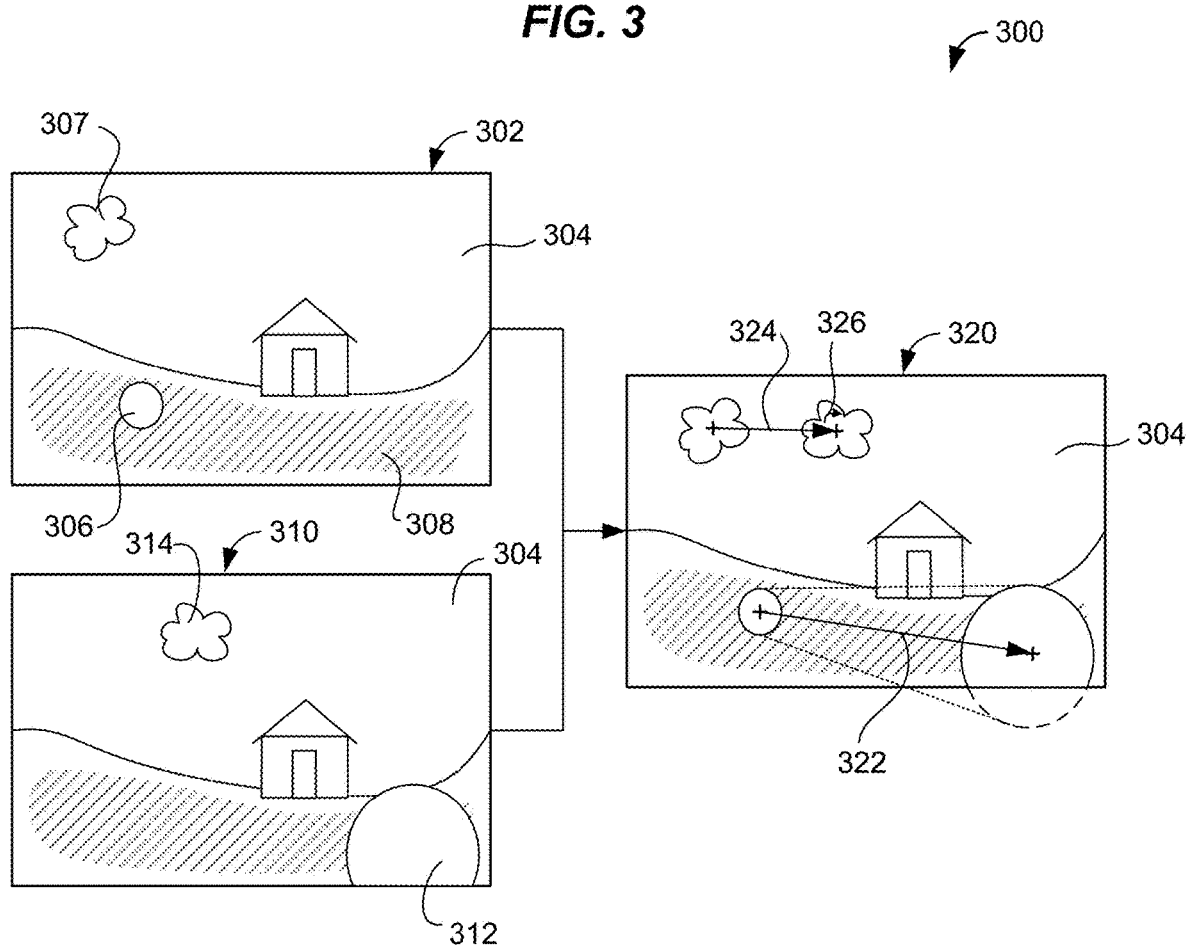
FIG. 3 is a schematic drawing illustrating parts of two digital still images as displayed by a digital display device, for generating a motionized digital image.

Referring to FIG. 3, operation of an algorithm using a set 300 of two input still images 302, 310 to produce an output image 320 is illustrated. The first image 302 represents a first key frame, including a cloud region 307, ball 306, grass 308 and sky 304. By adding a single key frame 310 of the scene either without the ball or with the ball 312 in a different position along the X or Y axes (or further into the Z axis) as shown in frame 310. Then, the system 100 fills in the otherwise occluded info (e.g., region 208) when creating the motionized output image 320, and also allows for a variety of movements of the identified object (i.e. soccer ball) along all 3 axes; 2) the same concept can be accomplished by providing metadata in lieu of actual image data.

In an aspect, movement along not just the X and Y axes (in the plane of the image data) but also Z-axis movement (perpendicular to the image plane) can be simulated based on a given camera position and focal length. For example, an algorithm may derive a motionizing vector 322 by recognizing the ball 306 in frame 302 and ball 312 in the second frame 310 as being the same object, then computing the vector 322 based on one or more corresponding points (in this case, the center point). Similarly, the system 100 may compute a scale parameter and/or blur factor that correspond to the movement of the ball relative to camera in the Z-axis. For example, if the ball moves closer, a scale factor (e.g., 200%) may be computed by comparing the images of the ball 306, 312. If the image 306 or 312 is out of focus, a blur factor may also be computed. The scale and blur may be linearly interpolated between the key frames 302, 310, or a more sophisticated interpolation technique may be used to provide a more interesting or lifelike motion. For example, a non-linear interpolation method may be used to conform changes in scale, blur, or another parameter to a non-linear curve, such as, for example, an exponential, quadratic or trigonometric curve. Similarly, using the same input images 302, 310, the system 100 may independently compute a different linear motion vector 324 and rotation vector 326, based on the different positions and orientations of any two other corresponding objects, for example the first cloud 307 and second cloud 314.

The images 306, 312 may also be analyzed as a single object (e.g., ball), which may be modeled as a rigid or elastic body. As such, the body may be imparted its own rotation or deformation vectors, and its known surface coloring rotated or deformed accordingly. Surface coloring that is occluded in all views may be provided using any of the methods described herein for providing occluded image data.

For movement in the image plane, occlusion of background data may be computed by overlay and may be later completely revealed once the object(s) in question have moved sufficiently from one location to the second. For example, given in two photos a subject soccer ball may be repositioned from one location to another, thereby fully exposing background that was occluded by its first position. In a Z-axis soccer ball example (not shown), only part (not 100%) of the originally occluded information may be revealed by the soccer ball's movement, for example, when zooming out from an originally zoomed in key frame.

The direction of perceived movement may be controlled by varying the order in which two (or more) key frames are processed. This applies in varying degrees where the 2 (or more) key frames differ in the positioning of some object(s) of interest in the X, Y and/or Z axis or axes. The order of key frame processing relates to resulting video direction(s) of movement, which are determined by the vector (not just scalar) displacement of pixels. Directionality of movement may vary depending upon the order of key frame processing, and resulting movement can be tailored for different effects. For example, given at least two key frame images, a first one wherein the ball is closer (z axis) to the viewer ('zoomed in') as opposed to the second key frame in which the ball is farther (z axis) from the viewer ('zoomed out'), the order of processing can be used to determine whether the motionized output zooms "in" or "out" of the ball. The resulting motion may zoom out if the frames are processed in a first-second sequence and may zoom in if processed in a second-first sequence.

For further example, the motion can be right to left or left to right if the first key frame shows the soccer ball to the left and the second frame shows the soccer ball to the right, as opposed to right to left key frames 302, 310 and resulting movement; vertical movement can likewise be computed. In addition, differences in key frame processing order may be evidenced by different blurring effects; different depths of focus of the background or foreground or object(s) therein; different movement characteristics of the object(s) therein; differently timed movement(s) of some of the object(s) therein; or, by different levels of detail in some object(s) within the scene.

Algorithms 108 for adding motionized effects by varying parameters may include filters or functions (for example, as provided by Adobe Photoshop™, GIMP™, and similar image processing software) for different effects. So, non-uniform blurring, sharpening, or motion (e.g. using a Gaussian filter or function) may be used distribute the blurring, sharpening or motion at issue in a non-uniform distribution. For instance, a sharpening filter or function such as is employed in edge enhancement could detect relevant object edges and via low pass filtering on the identified edges could heighten high frequencies with resulting sharper edges.

For example, when motionizing an image of a starry sky through the back of a moving space capsule, relatively fixed stars (perhaps editorially relevant ones) may be sharpened rather than blurred. The motionizing effect may cycle between a unfiltered key frame image of the stars and sharpened key frame image, for example. In some cases, a sharpening or blurring effect may result from differences between two key frames showing markedly different depths of focus (z axis zooming in/out) changes, or from viewing through partially transmissive, partially opaque or diaphanous media such as windows, gauze drapes, dust clouds, soap bubbles, etc., where the partially transmissive view of at least some material part of one key frame differs from the other. Along with blurring or sharpening, the algorithms may include a second key frame to identify (or derive) a light source and add appropriate shadowing or shading, such as by applying a photogrammetric technique.

In an aspect, motionizing algorithms may rely on only one key frame—rather than requiring at least two—by creating a second key frame from the first (or vice-versa), for example by zooming into a single key frame and blurring the background (perhaps in a non-uniform manner as outlined above) while sharpening the foreground. Again, referring to the soccer ball example, the now 'larger' ball occludes more of the background in the zoomed-in frame.

Figure 4:
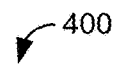
FIG. 4 is a data table illustrating various data parameters used in motionizing.

Referring to FIG. 4, parameters 400 motionizing a digital still image may be recorded as metadata and used to identify which portions or object(s) in an image are to be motionized, which portions or objects are to remain static, and which image transformation should be made part of the motionizing effect, for example, e.g. blurring, sharpening, non-uniform or uniform movement, constant or non-constant motion.

Region parameters 402 may include, for example, locations and geometric shapes of image regions to be motionized, and regions to remain static; whether the region location, shape, or orientation is static (fixed) or subject to being motionized; and whether a motionized region should be motionized as a rigid body, or as a deformable body.

Motion data parameters 404 may include, for example, a motion path; a center of rotation; velocity, acceleration, and direction of rotation or of linear motion, motionized object or region scales (e.g., 100%, 50% 200%), non-rigid body parameters (e.g., elasticity, viscosity, force vectors); and rates of change for any scalar or vector motion data parameter.

Parameters 406 for fixed (non-motionized) regions or for non-moving portions of the image may include data for texturing occluded regions that are revealed by movement of a motionized region, filters (e.g., blurring, sharpening, edge detection, or various special effects), filter progressions (e.g., an order in which different filters are to be applied), and rates of any changes in the image controlled by the fixed data parameters 406.

Parameter 408 for controlling lighting and coloration may include, for example, a location and direction of light sources; brightness; hue, saturation, and rates of any changes in the image controlled by the lighting and coloration parameters 408.

Output video parameters 410 may include, for example, image frame size, source key frame identifiers, number of output frame, frame rate, and video format. Suitable video formats may include, for example, MPEG-1, MPEG-2, MPEG-4, Adobe™ Flash, Windows™ Media Video, Quicktime file format, GIF, WebM, 3GPP, 3GPP2, Nullsoft™ streaming video, or other suitable format. Normally, output video parameters such as these are not varied within a single file or streaming session.

Motionizing algorithms 108 may be designed to make 'smart' decisions about filters based on the differences in the key frames and the type, distance, and/or speed of movement desired. Users may be enabled to override such decisions in a Settings or Preferences interface. Metadata provided along with raw image key frames may be used to tailor the output, e.g. the aforementioned 'constant or non-constant motion' example. In an aspect, image metadata may be provided as XML tags, VRML tage, or even as binary data in a separate file.

The metadata may also be used to support user interactivity with a motionized image, for example by applying different sets of metadata to the same key frames and outputting different results, in response to user feedback. The motionizing module may animate and otherwise manipulate the key frame data or derived frame data differently, depending on metadata values. For example, in a scene with Batman throwing his Batarang (bat-shaped boomerang device), a motionizing module may animate the Batarang to move in x, y or z planes, to twirl clockwise or counterclockwise, or otherwise vary changes in the blurring or sharpening detail, depending upon which set of metadata a user selects.

In other aspects, using uniquely identified objects or layers, motionizing may include a) not just constant motion, but variable speed motion, e.g. amber waves of grain with variable gusts of wind disturbing the grain; b) layers of motion, i.e. layers showing different motion for different planes or layers, e.g. a panoramic key frame of the amber waves of grain with clouds in the background and wheat in the foreground with the wheat moving at a different speed or rate vs. the clouds.

A parameter may be added to a motionizing module to control the blurring factor that enhances the look of the result. For example, a blur factor may specify a number of pixels adjacent to the source pixel(s) that the system is allowed to blur. This factor can be provided with the image, or out of band as separate data, or simply as metadata.

The motionizing module outputs a motionized digital image, comprising an animation loop in any suitable digital format for animated pictures. The output motionized digital image may be used in place of a still image in any context that a still image would be used, for example, in an ebook, e-zine, digital graphic novel, website, picture or poster, or user interface. On an embodiment, motionized images are displayed in an electronic "picture frame" or "poster frame" to which a user provides electronic source images. The electronic frame may be programmed to automatically create certain predetermined motionizing algorithms. For example, detecting two or more supplied images with overlapping image regions, a motionizing module may automatically stitch together a panoramic image, and create a motionized cycle by slowly panning over the image using a view frame that is substantially smaller than the panoramic image. For further example, detecting that the background of two or more images is the same while foreground objects have moved, the motionizing module may automatically generate an animation of the foreground objects.

Figure 5:
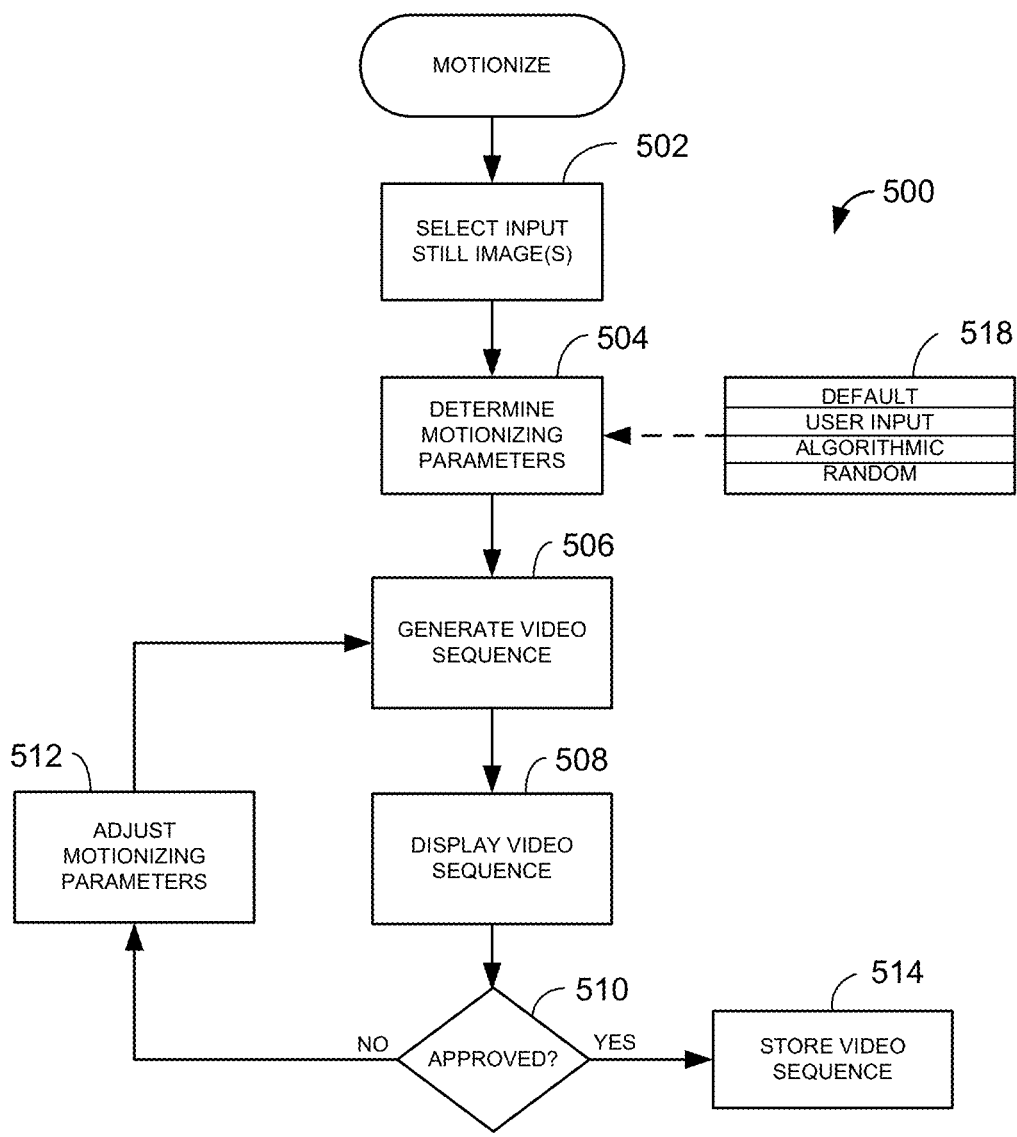
FIG. 5 is a flow chart illustrating elements of a method for motionizing a digital still image that may be executed by a motionizing apparatus.

The foregoing details may be incorporated into a method for motionizing one or more still images, that may be executed by a motionizing apparatus 102. FIG. 5 shows elements of one such method 500 for motionizing a digital still image. At 502, the apparatus selects one or more input still images for motionizing, resulting in a set of one or more selected images. In an aspect, the apparatus may select the image in response to user input, for example, user selection of a static image file or files in a computer memory location accessible to the apparatus. In an alternative, or in addition, the apparatus may analyze static image files placed in a designated electronic directory folder or other data structure, and identify two or more similar images that are suitable for use as input to a motionizing method 500. In another alternative, the apparatus may select two or more video frames from a video file, based on suitability for use as input to a motionizing process that creates an alternative motionized video, for artful or other effects. Image selection 502 may include checking image format, resolution, and size to ensure compatibility with motionized output, analysis of image content for object recognition, light sources, exposure settings, identification of occluded areas, and other operations pertinent to the selected motionizing process and desired output. Generally, images in the selected set should have, or be converted to have, the same image size and pixel resolution.

In parallel to selecting of input images 502, prior to said selecting 502, or after said selecting 502, the motionizing apparatus may determine 504 the motionizing parameters 518 to be applied to the set of one or more selected images. The motionizing parameters 518 may be derived from one or more various sources: from a default (predetermined) list, from user input, generated algorithmically, or generated randomly. In many embodiments, a mixture of parameter sources may be used. For example, many parameters may be fixed or predetermined but subject to user modification via a user interface, while others may be selected by an algorithm based qualities of the input images, and others may be varied randomly. A user may select motionizing parameters via a suitable user interface. Examples of specific motionizing parameters have been provided in the foregoing description and in FIG. 4. Other parameters may also be suitable. In general, determining the motion parameters 504 should be based on selecting parameters that are likely to achieve some desired result specified by the system user.

At 506, the motionizing apparatus may generate a video sequence based on the input images selected at 502 and the motionizing parameters determined at 504. Generating the video sequence 506 may include generating two or more key frames and all intervening frames, based on the motionizing parameters, using interpolation, selective filtering and other motionizing techniques as described herein, which may be combined with any suitable animation algorithm for the desired output format. The animation algorithm should be adapted for motionizing from original still images, and may also include information obtained through known 2-D or 3-D computer animation methods. Generating the video sequence 506 may further include generating a video file according to a selected video format, and saving the generated video file in a computer memory or storage medium. Further details of generating a video sequence are provided in connection with FIG. 6, and elsewhere in the present disclosure.

At 508, the motionizing apparatus may display one or more video sequences resulting from generating the video sequence 506, using a suitable display device, for example, a computer monitor or other display screen, video projector, or virtual reality visor. The user may review the video and the motionizing apparatus may receive a signal indicating approval or disapproval, at 510. If the video is approved, the motionizing apparatus may store the video sequence 514 in one or more selected video file formats, concluding the method 500. If the video is not approved, the motionizing apparatus may adjust one or more motionizing parameters 512 and generate a new video sequence 506 based on the adjusted motionizing parameters.

Figure 6:
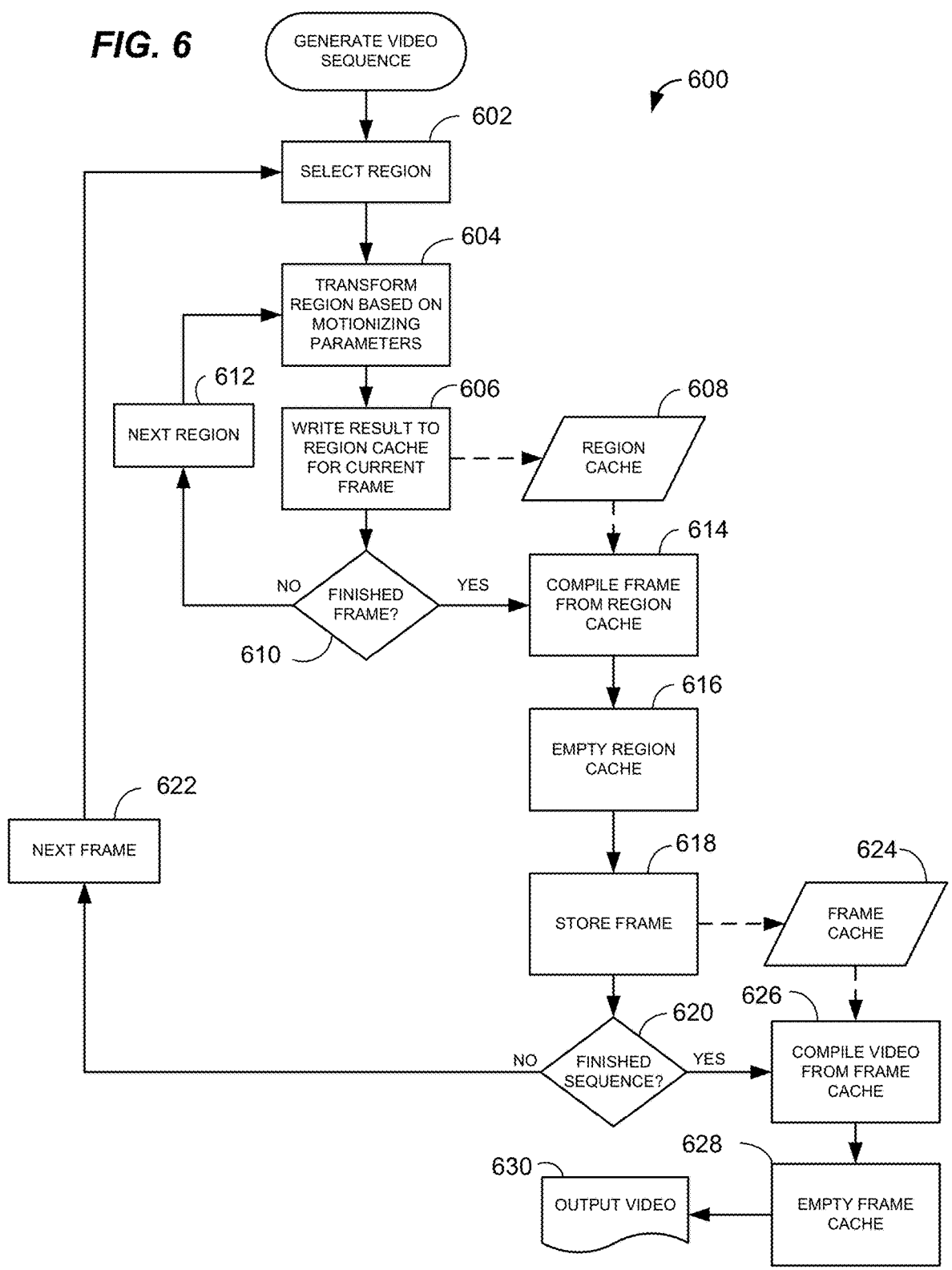
FIG. 6 is a flow chart illustrating generating a video sequence that is part of motionizing a digital still image as diagramed by FIG. 5.

Critical operations of the motionizing method 500 may include generating a video sequence 506. FIG. 6 shows more detailed aspects 600 of generating a video sequence as part of motionizing a digital still image 500. The depicted operations are merely examples. At 602, a motionizing apparatus may select a region of the one or more digital still images. For example, the region may be a first grid in a grid array making up the images. In an alternative, or in addition, the region may be a recognized moving object appearing in the image.

At 604, the motionizing apparatus may transform the current region based on motionizing parameters. If the current frame is a key frame supplied directly from stored input image data, the transformation applied may be null, meaning the region may be left unchanged. If the current frame is not a key frame, one or more motionizing operations may be applied as described herein, for example, blurring, sharpening, moving, filling in formerly occluded portions, moving a light source, changing lighting color or intensity, and so forth. One or more different transformations may be applied, on one or more corresponding layers, or on a shared layer. At 606, the motionizing apparatus may write the result to a region cache 608 for the current frame. At 610, the motionizing apparatus determines whether the transformations are completed for the current frame. If additional regions need to be transformed, the apparatus selects the next region 612 of the image, and repeats the operations 604, 606, 610 for the next region.

If the apparatus determines at 610 that no more regions need to be transformed, it may compile an integrated transformed frame 614 from the region data in the region cache 608. After compiling the frame, the apparatus may empty the region cache 616, or set a flag in the cache indicating the end of the current frame and start of the next frame. At 618, the apparatus may store the transformed frame 618 in a frame cache 624 (also called a frame buffer).

The apparatus may then determine whether the current video sequence is finished, at 620, based on determined parameters for the finished sequence (e.g., number of frames). If the video sequence is not finished, the apparatus may set itself to process the next frame 622 and loop back to box 602. If the video sequence is finished, the apparatus may compile a video sequence 626 from the frames stored in the frame cache 624, by arranging the completed frame in sequence and converting the frame sequence to one or more desired video formats. Once the desired video files have been created, the apparatus may empty the frame cache 628 for the next application of the video generation operations 600, and output 630 the resulting video files to a video player, to a storage device, or both.

The method 500 and more detailed operations 600 are summarized by the method 700 illustrated by FIG. 7. The method 700 may be performed by a computer including a processor coupled to a memory for addition of motion effects to digital still images, e.g., the motionizing apparatus 102. The method 700 may include selecting a source digital still image from the memory 710. The method may further include dividing 720 the source digital still image into at least two regions. The at least two regions may include one or more non-overlapping fixed regions and one or more movable regions treated as if layered over the fixed regions. "Treated as if layered" means that, whether or not the movable regions exist in a layer or layers separate from the fixed regions in the source image, when processing the source image, the movable regions will either be processed in one or more layers separate from the fixed regions even if only temporarily, or processed separately as if existing in a separate layer. The dividing may be based on a set of geometric region boundary data (e.g., a digital mask) and motion data for each of the one or more movable regions. In an alternative, or in addition, the dividing may be based on fixed geometric regions, such as squares or rectangles in a grid. The motion data may be or may include a set of motionizing parameter for a digital still image, or set of digital still images, retrieved from the memory. In some embodiments, each of the non-overlapping regions may consists of as few as a single pixel.

The method 700 may further include determining 740 values for each pixel of the one or more fixed regions that is occluded by the one or more movable regions. This may include, for example, determining values for each pixel of the one or more fixed regions that is occluded by the one or more movable regions at least in part by extracting pixel values from a second source digital image wherein the pixels are not occluded by the one or more movable regions. In an alternative, or in addition, the determining may include determining the values for each pixel of the one or more fixed regions that is occluded by the one or more movable regions at least in part by generating the values procedurally based on non-occluded pixel values adjacent to borders of contiguous occluded pixel regions.

The method 700 may further include generating 740 a set of video frames in a sequence, wherein each frame in the set of video frames includes the one or more movable regions transformed by the motion data based on a time of each frame and layered over the one or more fixed regions, and storing the set of video frames as a video file in a non-volatile computer memory. In an aspect, generating the set of video frames may include arranging the set of video frames in an endless loop.

In an aspect, the motion data for each of the one or more movable regions may include an independently determined motion vector. Optionally, the independently determined motion vector varies with time over a path. Thus, the motion data for each of the one or more movable regions may include a motion vector that varies with time over a path. For example, the processor may change scale or direction parameters of the motion vector applied between frames as a region moves along a path. The processor may determine the motion vector of each region independently of the motion vector for another of the regions, for example, using a different algorithm or different parameters.

The method 700 may further include transforming the one or more movable regions for respective frames of the set of video frames. The transforming may include scaling the one or more movable regions based on the motion vector, the time of each frame, and data defining a camera position and focal length. The transforming may further include blurring at least a portion of the one or more movable regions in each frame, based on a selected blurring algorithm. In an alternative, or in addition, the transforming may further include sharpening at least a portion of the one or more movable regions in each frame, based on a selected sharpening algorithm. The blurring or sharpening may vary with time, or with pixel location. For example, the processor may change the blurring algorithm or sharpening algorithm (e.g., by varying parameters of the blurring or sharpening algorithm) between frames, periodically, or aperiodically. This variation may cause a visible difference in the output as a special visual effect. In addition, the processor may change the blurring algorithm or sharpening algorithm based on a location of a pixel or region of pixels. For example, the processor may interpolate a parameter value of an algorithm between an initial value and a target value based on a linear or non-linear relationship between a position of a pixel in a defined reference frame of the image and the parameter value. Such interpolation can be used to provide smoother transitions between transforming and non-transforming regions, or other special effects (e.g., waves, heat noise, and so forth).

In another aspect, the method 700 may include transforming the one or more fixed regions for respective frames of the set of video frames. This transforming may include applying a pixel transformation filter to at least one of the one or more fixed regions. Applying the filter may include, for example, varying input parameters of the filter based on the time of each frame. For further example, applying the filter may include applying the filter to output of the filter for the preceding frame of the sequence. The method 700 may include storing 750 a set of video frames prepared by the operations described above as a video file, in which the original digital still image or images are motionized.

In view of the foregoing disclosure, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, all illustrated blocks are not necessarily required to implement the methodologies described herein. In addition, operations have been described but not shown for simplicity of illustration.

Figure 8:
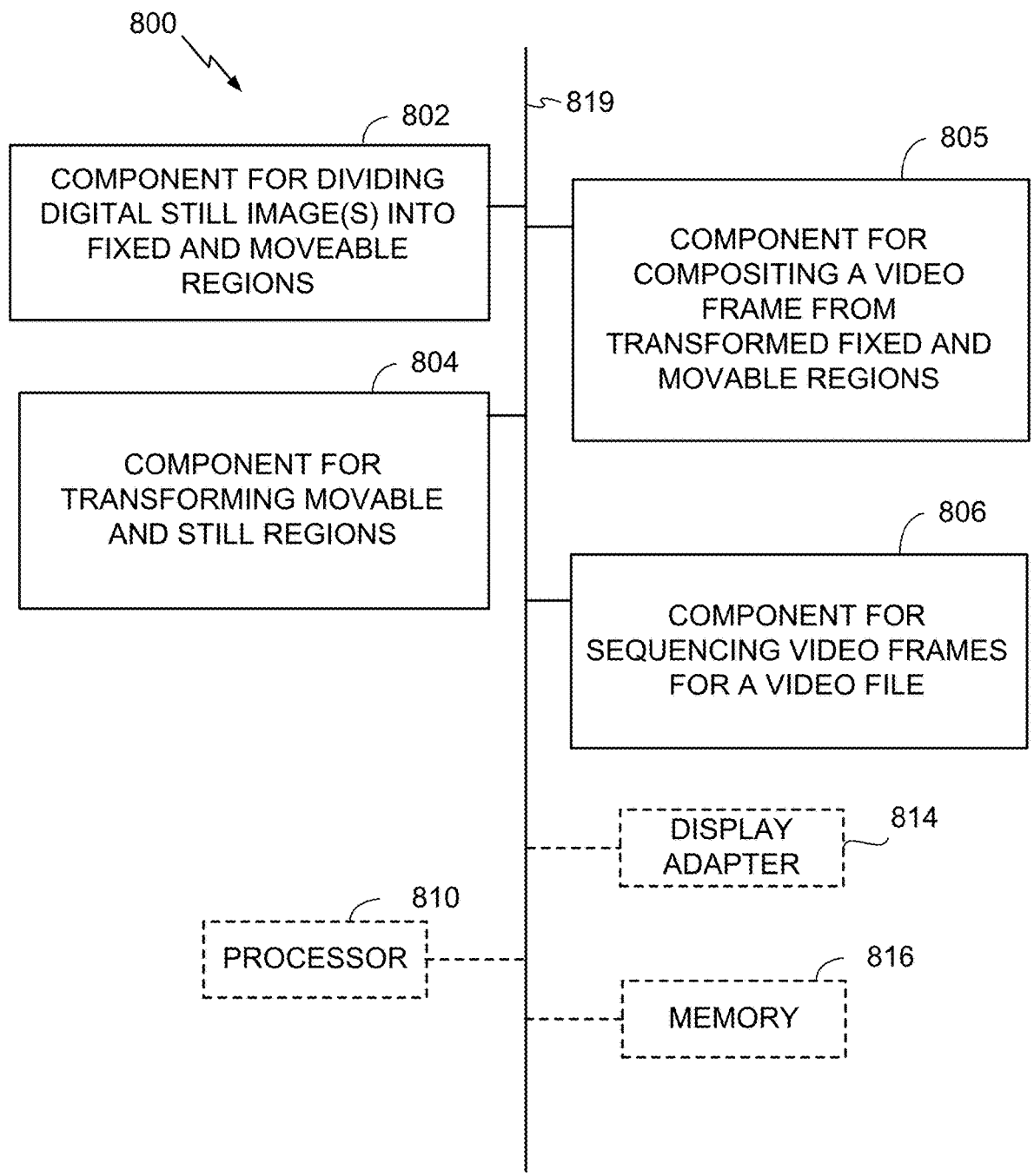
FIG. 8 is a block diagram illustrating aspects of a motionizing apparatus for adding motion effects to digital still images.

In another aspect of the disclosure, referring to FIG. 8, an apparatus 800 for adding motion effects to digital still images includes a memory 816 coupled to an image processor 810. The memory may hold program instructions that when executed by the processor 810, cause the apparatus 800 to perform the method 500 or 700 described above, and optionally one or more additional operations described in connection with those methods. The apparatus 814 may further include a display adaptor 814 that converts a digital video file to a video signal suitable for use by a video display device, for example an LCD display or the like. The components of the apparatus 800 may be coupled by a bus 819 or another electronic connector.

The apparatus 800 may include a functional component 802 for dividing digital still images into fixed and moveable regions. The component 802 may comprise a means for dividing digital still images into fixed and moveable regions. Said means may include the processor 810 and memory 816, wherein the memory holds, and the processor executes, an algorithm for said dividing. The algorithm may include, for example, dividing the image into fixed and movable regions by comparing objects in two or more still images, and masking off the fixed from the movable regions.

The apparatus 800 may include a functional component 804 for transforming movable and still regions. The component 814 may comprise a means for said transforming. Said means may include the processor 810 and memory 816, wherein the memory holds, and the processor executes, an algorithm for said transforming. The algorithm may include, for example, calculating a pixel location in a next frame based on a motion vector, filling in occluded background image portions that are revealed by movement, and altering the coloration of a pixel based on filtering operations such as blurring, sharpening, or color adjustment.

The apparatus 800 may include a functional component 805 for compositing a video frame from transformed fixed and moveable regions. The component 805 may comprise a means for said compositing. Said means may include the processor 810 and memory 816, wherein the memory holds, and the processor executes, an algorithm for said compositing. The algorithm may include, for example, layering moved regions over a fixed region, and coloring in any revealed pixels to match the fixed background layer.

The apparatus 800 may include a functional component 806 for sequencing video frames for a video file. The component 806 may comprise a means for said sequencing. Said means may include the processor 810 and memory 816, wherein the memory holds, and the processor executes, an algorithm for said sequencing. The algorithm may include, for example, the operations 600 as described in connection with FIG. 6.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include virtual or augmented reality output devices (e.g., headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or another format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method by a computer comprising a processor coupled to a memory, the method comprising:
    selecting a two-dimensional source digital still image from the memory;
    dividing the source digital still image into at least two regions comprising one or more non-overlapping fixed regions and one or more movable regions to be treated as layered over the fixed regions, based on a set of geometric region boundary data and motion data for each of the one or more movable regions in the memory, wherein each of the at least two regions are two-dimensional;
    transforming the one or more movable regions for respective frames of the set of video frames based on information selected from the set of geometric region boundary data and motion data for each of the one or more movable regions, a time of each frame, data defining a camera position and focal length, and an algorithm;
    determining values for pixels of the one or more fixed regions that are occluded by the one or more movable regions,
    generating, from the source digital still image and the motion data, a set of video frames in a sequence, wherein each frame in the set of video frames includes the one or more movable regions transformed by the motion data based on the time of the each frame and layered over the one or more fixed regions wherein the motion data defines motion of a corresponding one of the one or more movable regions relative to the fixed regions; and
    storing the set of video frames as a video file in a non-volatile computer memory.

2. The method of claim 1, wherein each of the non-overlapping regions consists of a single pixel.

3. The method of claim 1, wherein the motion data for each of the one or more movable regions comprises a motion vector that varies with time over a path.

4. The method of claim 1, wherein the transforming further comprises transforming the one or more movable regions for respective frames of the set of video frames at least in part by scaling the one or more movable regions based on the motion vector, the time of each frame, and data defining a camera position and focal length.

5. The method of claim 1, wherein the transforming further comprises transforming the one or more movable regions for respective frames of the set of video frames at least in part by one or more of: blurring at least a portion of the one or more movable regions in the each frame, based on a selected blurring algorithm; or sharpening at least a portion of the one or more movable regions in the each frame, based on a selected sharpening algorithm.

6. The method of claim 5, wherein at least one of the blurring or transforming varies with time.

7. The method of claim 5, wherein at least one of the blurring or transforming varies with pixel location.

8. The method of claim 1, wherein determining values for pixels of the one or more fixed regions that are occluded by the one or more movable regions comprises extracting pixel values from a second source digital image wherein the pixels are not occluded by the one or more movable regions.

9. The method of claim 1, wherein determining values for pixels of the one or more fixed regions that are occluded by the one or more movable regions comprises generating the values procedurally based on non-occluded pixel values adjacent to borders of contiguous occluded pixel regions.

10. The method of claim 1, further comprising transforming the one or more fixed regions for respective frames of the set of video frames at least in part by applying a pixel transformation filter to at least one of the one or more fixed regions.

11. The method of claim 10, wherein the applying the pixel transformation filter comprises varying input parameters of the filter based on the time of each frame.

12. The method of claim 11, wherein the applying the pixel transformation filter further comprises applying the filter to output of the pixel transformation filter for the preceding frame of the sequence.

13. An apparatus comprising a processor for image processing coupled to a memory, the memory containing instructions, that when executed by the processor cause the apparatus to perform:
   selecting a two-dimensional source digital still image from the memory;
   dividing the source digital still image into at least two regions comprising one or more non-overlapping fixed regions and one or more movable regions to be treated as layered over the fixed regions, based on a set of geometric region boundary data and motion data for each of the one or more movable regions in the memory, wherein each of the at least two regions are two-dimensional;
   transforming the one or more movable regions for respective frames of the set of video frames based on information selected from the set of geometric region boundary data and motion data for each of the one or more movable regions, a time of each frame, data defining a camera position and focal length, and an algorithm;
   determining values for pixels of the one or more fixed regions that are occluded by the one or more movable regions,
   generating, from the source digital still image, a set of video frames in a sequence, wherein each frame in the set of video frames includes the one or more movable regions transformed by the motion data based on the time of the each frame and layered over the one or more fixed regions wherein the motion data defines motion of a corresponding one of the one or more movable regions relative to the fixed regions; and
   storing the set of video frames as a video file in a non-volatile computer memory.

14. The apparatus of claim 13, wherein the memory holds further instructions for the generating, wherein the motion data for each of the one or more movable regions comprises a motion vector that varies with time over a path.

15. The apparatus of claim 13, wherein the memory holds further instructions for the transforming the one or more movable regions for respective frames of the set of video frames at least in part by scaling the one or more movable regions based on the motion vector, the time of each frame, and data defining a camera position and focal length.

16. The apparatus of claim 13, wherein the memory holds further instructions for the transforming the one or more movable regions for respective frames of the set of video frames at least in part by one or more of: blurring at least a portion of the one or more movable regions in the each frame, based on a selected blurring algorithm; or sharpening at least a portion of the one or more movable regions in the each frame, based on a selected sharpening algorithm.

17. The apparatus of claim 13, wherein the memory holds further instructions for the determining values for pixel of the one or more fixed regions that are occluded by the one or more movable regions at least in part by generating the values procedurally based on non-occluded pixel values adjacent to borders of contiguous occluded pixel regions.

18. The apparatus of claim 13, wherein the memory holds further instructions for transforming the one or more fixed regions for respective frames of the set of video frames at least in part by applying a pixel transformation filter to at least one of the one or more fixed regions.

19. The apparatus of claim 18, wherein the memory holds further instructions for the applying the pixel transformation filter at least in part by varying input parameters of the filter based on the time of each frame.

20. An apparatus comprising:
   means for selecting a two-dimensional source digital still image from the memory;
   means for dividing the source digital still image into at least two regions comprising one or more non-overlapping fixed regions and one or more movable regions to be treated as layered over the fixed regions, based on a set of geometric region boundary data and motion data for each of the one or more movable regions in the memory, wherein each of the at least two regions are two-dimensional;
   means for transforming the one or more movable regions for respective frames of the set of video frames based on information selected from the set of geometric region boundary data and motion data for each of the one or more movable regions, a time of each frame, data defining a camera position and focal length, and an algorithm;
   means for determining values for pixels of the one or more fixed regions that are occluded by the one or more movable regions,
   means for generating, from the source digital still image and the motion data, a set of video frames in a sequence, wherein each frame in the set of video frames includes the one or more movable regions transformed by the motion data based on the time of the each frame and layered over the one or more fixed regions wherein the motion data defines motion of a corresponding one of the one or more movable regions relative to the fixed regions; and
   means for storing the set of video frames as a video file in a non-volatile computer memory.

* * * * *